United States Patent
Shioji

(10) Patent No.: US 8,854,554 B2
(45) Date of Patent: Oct. 7, 2014

(54) CHANNEL SETTING APPARATUS AND TELEVISION

(75) Inventor: Tomonori Shioji, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 1733 days.

(21) Appl. No.: 12/157,258

(22) Filed: Jun. 9, 2008

(65) Prior Publication Data

US 2008/0303960 A1 Dec. 11, 2008

(30) Foreign Application Priority Data

Jun. 11, 2007 (JP) ................................. 2007-153783

(51) Int. Cl.
*H04N 5/50* (2006.01)
*H04N 21/84* (2011.01)
*H04N 21/434* (2011.01)

(52) U.S. Cl.
CPC ................ *H04N 5/50* (2013.01); *H04N 21/84* (2013.01); *H04N 21/4345* (2013.01)
USPC ............... 348/731; 348/732; 725/48; 725/49

(58) Field of Classification Search
USPC .......................... 348/731, 732; 725/46, 48, 49
See application file for complete search history.

(56) References Cited

U.S. PATENT DOCUMENTS

| | | | | |
|---|---|---|---|---|
| 5,182,646 A | * | 1/1993 | Keenan | ........................ 348/732 |
| 2002/0178449 A1 | * | 11/2002 | Yamamoto et al. | ............. 725/56 |
| 2004/0172648 A1 | * | 9/2004 | Xu et al. | ......................... 725/38 |
| 2007/0064150 A1 | * | 3/2007 | Lee | ................................ 348/468 |
| 2007/0288960 A1 | * | 12/2007 | Akiyama | ........................ 725/40 |

FOREIGN PATENT DOCUMENTS

| | | | | |
|---|---|---|---|---|
| JP | H10-224705 A | | 8/1998 | |
| JP | 2002-374466 A | | 12/2002 | |
| JP | 2006-332851 A | | 7/2006 | |
| JP | 2006-333126 A | | 12/2006 | |
| WO | WO 99/35848 | * | 7/1999 | ............... H04N 7/16 |

OTHER PUBLICATIONS

Japanese Notice of the reason for refusal, dated Apr. 15, 2009.

* cited by examiner

*Primary Examiner* — Brian T Pendleton
*Assistant Examiner* — Alan Luong
(74) *Attorney, Agent, or Firm* — Yokoi & Co., U.S.A., Inc.; Toshiyuki Yokoi

(57) ABSTRACT

Disclosed is a channel setting processing including the steps of: generating a channel map data including physical channel information about a physical channel available to receive a broadcast signal, the physical channel information being at least a main channel number of a virtual channel, a sub channel number of the virtual channel, a broadcast station name, and a predetermined program information indicating program contents; judging whether or not there exist plural physical channels on standby for reception and capable of sharing the same program there between, based on at least two kinds of information among the physical channel information, recorded on a channel to channel basis on the channel map data; and, based on the judgment that there exit plural physical channels sharing the same program, disenabling other physical channels except one physical channel thereamong to be selected despite the instruction of physical channel selection through external manipulation.

4 Claims, 5 Drawing Sheets

FIG. 3

| Physical channel | Main channel number | Sub channel number | Broadcast station name | Contents information | Channel selection enable/disable information |
|---|---|---|---|---|---|
| 3 | 17 | 1 | D | News | ADD |
| 4 | 51 | 1 | E | Sports | ADD |
| 5 | 23 | 1 | F | Movie | ADD |
| 6 | 30 | 2 | G | Music | ADD |
| 7 | 40 | 2 | F | Movie | DEL |
| 8 | 17 | 1 | D | News | DEL |

CHANNEL SETTING APPARATUS AND TELEVISION

CROSS-REFERENCES TO RELATED APPLICATIONS

The present application is related to the Japanese Patent Application No. 2007-153783, filed Jun. 11, 2007, the entire disclosure of which is expressly incorporated by reference herein.

BACKGROUND OF THE INVENTION

1. Field of the Invention

The present invention relates to a channel setting apparatus and a television for setting a channel capable of receiving a broadcast signal.

2. Description of the Related Art

When receiving a broadcast signal to watch and listen a program, televisions in some area can receive the program of the same contents with a different frequency range.

Japanese Unexamined Patent Application Publication (JP-A) No. H10-224705 discloses the guide channel setting method having the steps of: judging whether or not there exist broadcast stations that can perform the same broadcast as the broadcast station corresponding to each selected channel (the relationship between the general station and the relay station), by referring to the relationship between the selected channel and the broadcast station, and a table that predetermines the relationship between the general station and the relay station; and if the relationship between the general station and the relay station exists, setting a guide channel to the broadcast station with a higher receive level between the two broadcast stations.

JP-A-2006-333126 discloses a television as an example of the channel registration processing, wherein the television is configured to judge whether or not a received broadcast signal is a television radio wave with a properly receivable signal intensity based on the comparison between an RF-AGC voltage, which is generated when the television receives a radio wave in the carrier frequency range corresponding to the selected channel, and the threshold value.

As mentioned above, the television that can receive the same program with different frequency ranges causes the same program to be appeared on the television screen through plural channels in channel selection operation, making a user feel cumbersome. Especially for selecting a channel with use of the up/down key operation, a user has troublesome unnecessary numbers of key operation.

According to the JP-A-H10-224705, any one channel is preset from among plural different channels on standby for receiving a broadcast signal where the television can receive a television broadcast from each broadcast station in relationship between the general station and the relay station for relaying radio waves. However, in the digital television broadcast in the recent years, only one content (program) is not always delivered from the same broadcast station in the same hours. For this reason, the television cannot judge whether or not television programs, which are received through plural physical channels corresponding to different frequency ranges, are the same program simply by checking the relationship (or the commonality) between each physical channel and the corresponding broadcast station.

BRIEF SUMMARY OF THE INVENTION

The present invention is made to solve the problem mentioned above, and the present invention provides a channel setting apparatus and a television that can accurately judge whether or not physical channels that are unnecessary for the user to select exist, resolves cumbersomeness, and gives the user comfort when the user operates the channel selection.

To accomplish the afore-mentioned object, one aspect of the present invention resides in a channel setting apparatus enabling any one physical channel from among different physical channels on standby for receiving a broadcast signal, to be selected for use based on a predetermined criterion.

The channel setting apparatus includes a channel map data generating unit, a same program judging unit, and a physical channel selecting unit.

The channel setting apparatus is configured to generate a channel map data including physical channel information about a physical channel available to receive a broadcast signal, the physical channel information being at least a main channel number of a virtual channel, a sub channel number of the virtual channel, a broadcast station name, and a predetermined program information indicating program contents.

The same program judging unit is configured to judge whether or not there exist plural physical channels on standby for reception and capable of sharing the same program therebetween, based on at least two kinds of information among the physical channel information, recorded on a channel to channel basis on the channel map data.

The physical channel selecting unit is configured to, based on the judgment that there exit plural physical channels sharing the same program, disenable other physical channels except one physical channel thereamong to be selected despite the instruction of physical channel selection through external manipulation.

According to the aspect of the present invention, the judgment on whether or not there exist plural physical channels on standby for reception and capable of sharing the same program therebetween is made based on at least two kinds of information among the physical channel information, recorded on a channel to channel basis on the channel map data, and thus the judgment result is extremely accurate. This configuration has the advantageous effect where physical channels that a user need not to select are disabled while the physical channel that a user need to select is available. (In this case, physical channel means plural physical channels on standby for receiving different broadcast signals from each other.)

The physical channel selecting unit may preferably be configured such that, based on the judgment that there exit plural physical channels sharing the same program, disenables other physical channels except one physical channel thereamong to be selected despite the instruction of physical channel selection with channel up or down key operation through external manipulation. This configuration permits a user to performs the channel selection by means of channel up/down operation, can skip physical channels that are not necessary to select for the user, reducing the time required for the channel selection operation and enabling to give the user comfort.

As more concrete configuration including all the components described above, provided is a television that performs the channel setting processing to enable any one channel from among different channels on standby for receiving a broadcast signal, to be selected for use based on a predetermined criterion and that is configured to include a tuner unit, a decode unit, and a microcomputer.

The tuner unit sequentially receives television broad signals in respective frequency ranges corresponding to respective physical channels specified after selection through a proper operating procedure.

The decode unit decodes the television broadcast signals received by the tuner unit and extracts predetermined channel information and program information included in the television broadcast signals.

The microcomputer, based on the extracted predetermined physical channel information and the program information, generates channel map data including physical channel information about a physical channel available to receive a television broadcast signal, the physical channel information being at least a main channel number of a virtual channel, a sub channel number of the virtual channel, a broadcast station name, and genre information indicating the genre of the program contents, saves the channel map data in a predetermined memory medium; by referring to the saved channel map data, judges whether or not there exist plural physical channels sharing the same main channel number, the same sub channel number, the same broadcast station name, and the same genre information between the plural physical channels themselves; based on the judgment where there exist plural physical channels having the same program contents, selects the lowest-numbered physical channel from among the plural physical channels and disables the other physical channels except the selected physical channel to be selected despite the instruction of physical channel selection with channel up or down key operation through external manipulation.

In a concrete product rather than such a television, the above-mentioned channel setting apparatus exerts the similar actions and effects. Also, in the description mentioned above, the technical idea of the present invention was explained using a category of goods such as a channel setting apparatus and a television. In addition to this idea, it is obvious that the present invention can be understood to include the invention of the method consisting of each unit that is included in a channel setting apparatus or a television and the processing steps corresponding to the configuration, and the invention of the program by which the microcomputer executes the processing function corresponding to each unit and the configuration that is included in the channel setting apparatus or the television.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character (s) present corresponding parts throughout:

FIG. 3 is a diagram showing an example of channel map data.

DETAILED DESCRIPTION OF THE INVENTION

Figure 1:
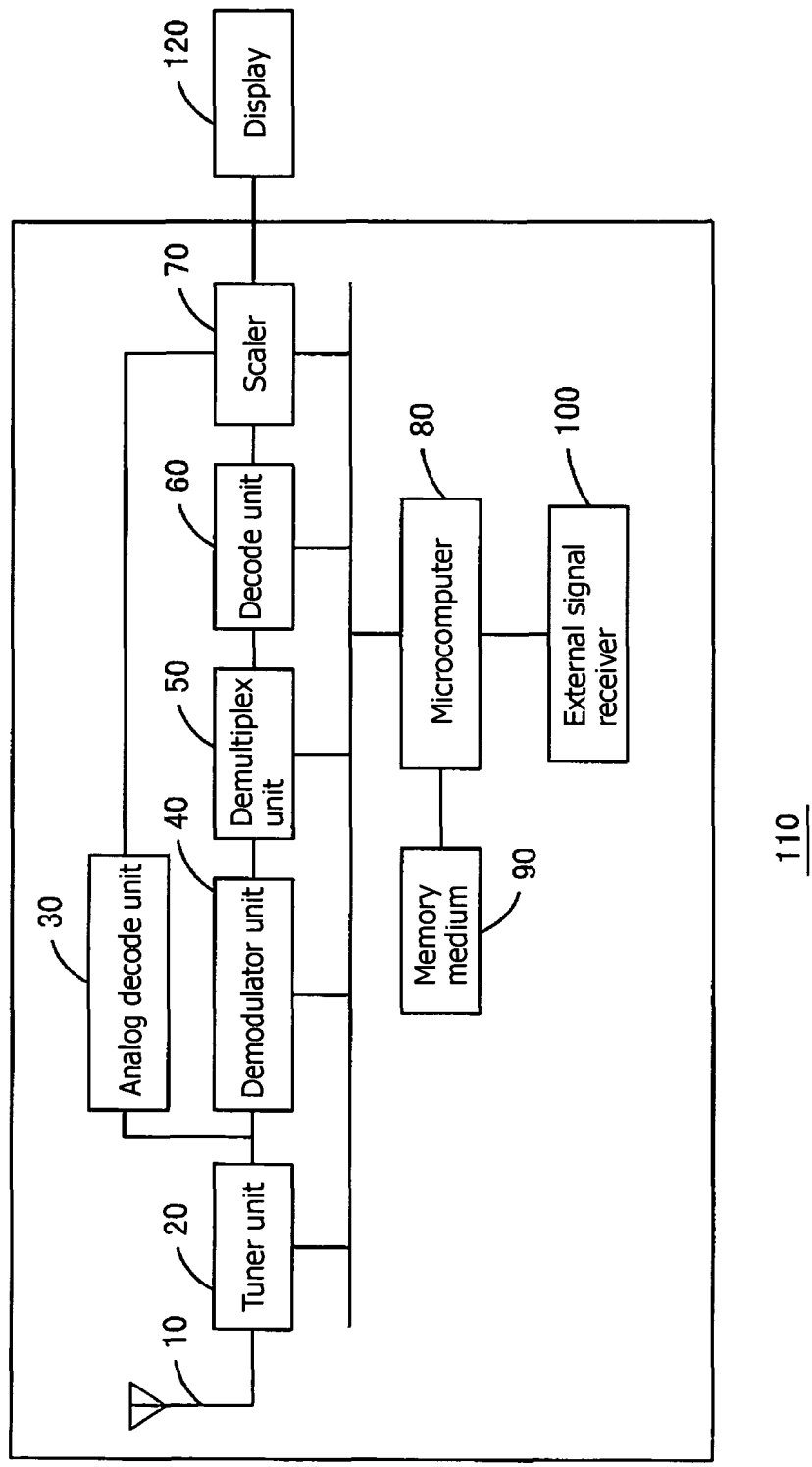
FIG. 1 is a block diagram showing a general configuration of the television related to the embodiment of the present invention.

Hereinafter, a preferred embodiment of the present invention will be explained in detail following the items described below with reference to the accompanying drawings.
(1) General Configuration of the Television
(2) Channel Setting Processing
(3) Conclusion
(1) General Configuration of the Television FIG. 1 shows a general configuration of the television (TV) 110 related to the present embodiment of the invention using a block diagram. The TV 110 plays a role of channel setting apparatus as a part of the function thereof In the TV 110, the tuner unit 20 receives a television broadcast signal (a digital broadcast signal or an analog broadcast signal) in a predetermined frequency range corresponding to the channel that a microcomputer 20 specifies through an antenna 10. The tuner unit 20 frequency-converts the received broadcast signal into an intermediate frequency signal (IF). The signal, which is frequency-converted from the digital broadcast signal, is output to a demodulator unit 40, and the signal, which is frequency-converted from the analog broadcast signal, is output to an analog decode unit 30.

The analog decode unit 30 decodes the inputted signal into a video signal (and an audio signal), and outputs the decoded video signal to a scaler 70. The demodulator unit 40 A/D converts the inputted signal and extracts a transport stream (TS) from the converted digital signal. The demodulator unit 40 also performs the processing of canceling the scramble of the TS. The TS, with the scramble being cancelled, is in a state multiplexed with plural transport packets, in each of which the video signal, audio signal, and various kinds of data are stored. A demultiplex unit 50 extracts the video signal (and the audio signal) corresponding to the channel specified by the microcomputer 80 from the TS.

The video signal (and the audio signal) extracted from the TS is in a state being encoded by following the MPEG standard, so a decode unit 60 decodes the video signal (and the audio signal) by following the MPEG standard. The decode unit 60 outputs the decoded video signal to the scaler 70. The scaler 70, which can perform the scaling processing (resolution conversion processing) according to the number of pixels of a display 120, and various kinds of image processing such as color correction processing and edge enhancement processing as necessary for the inputted video signal, generates a one-frame image data representing image data of one screen, and outputs the image data to the display 120 at a predetermined timing. The display 120 displays the image by driving the display based on the frame image data.

The microcomputer 80 includes a CPU, a ROM, a RAM, and controls each unit of the TV 110 based on a program saved in the ROM. The microcomputer 80 is connected, in addition to the CPU, the ROM, the RAM described above, to a memory medium 90 and an external signal receiver 100. The memory medium 90 is used as a memory to save, for example, the channel map data to be described later. The external signal receiver 100 receives an infrared light signal as an instruction signal transmitted from an external remote controller (not shown), A/D converts the signal, and outputs the converted signal to the microcomputer 80. The microcomputer 80 can control each unit of the TV 110 according to the instruction signal from the remote controller. As is abbreviated and not shown in the figure, the TV 110 also includes various general components as a TV, such as an audio signal circuit to output a sound based on the decoded audio signal, a speaker, and a power supply circuit to supply a power for driving each unit of the TV 110.

(2) Channel Setting Processing

Figure 2:
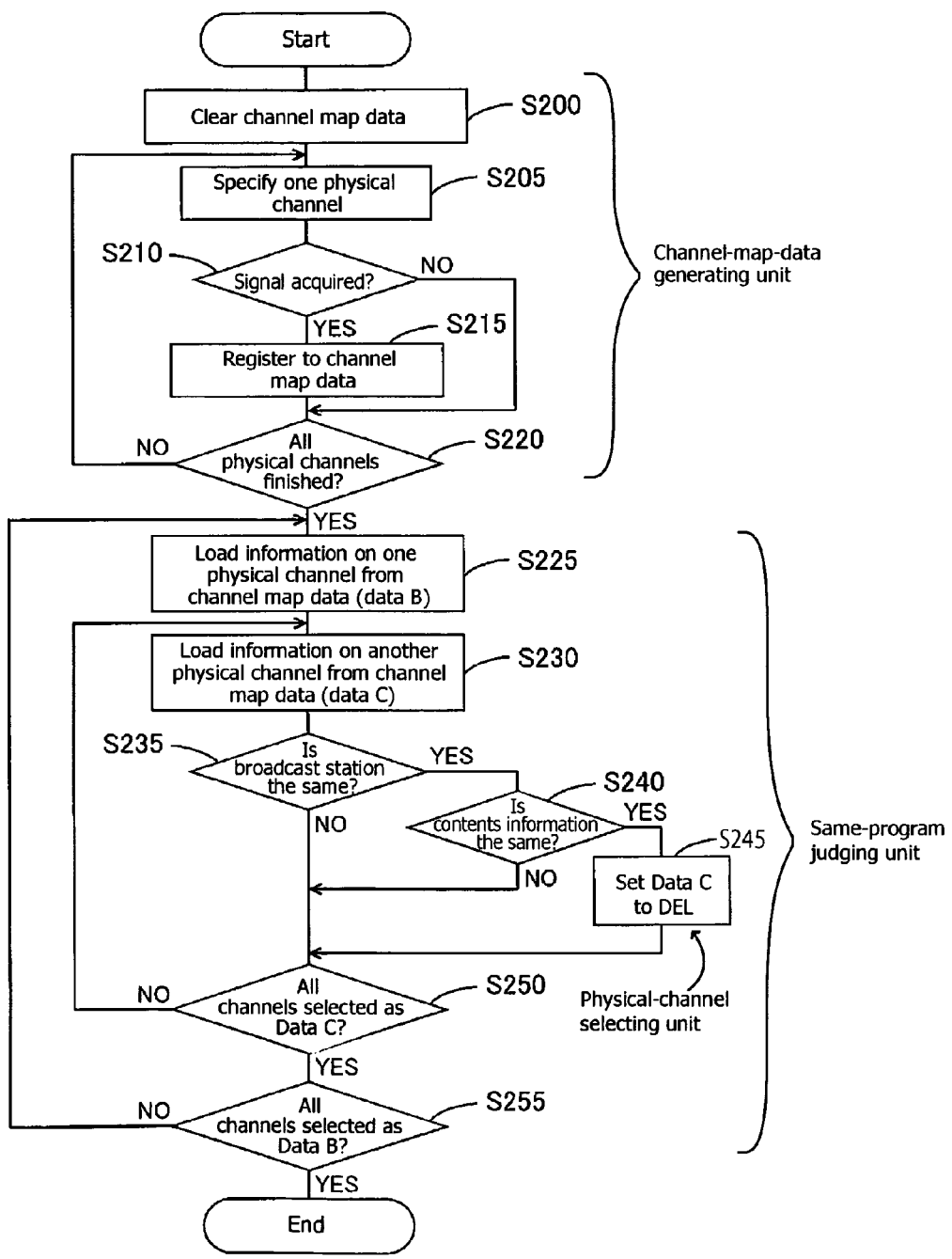
FIG. 2 is a flowchart showing an example of channel setting processing.

FIG. 2 is a flowchart showing an example of the channel setting processing that the TV 110 executes. The channel setting processing is a processing that is for updating the channel map data and that can be automatically executed at a predetermined time or manually executed by an instruction from a user and other methods.

In step S200, the microcomputer 80 clears the contents of the channel map data saved in the memory medium 90 at that time. That is to say, the microcomputer clears the information in a predetermined region of the memory medium 90 secured for recording the channel map data.

In step S205, the microcomputer 80 specifies one physical channel (physical ch) among the various physical channels, each of which is associated with each frequency band of the television broadcast signal. For example, the microcomputer 80 makes selection in ascending order among plural frequency bands.

In step S210, the microcomputer 80 specifies the tuner unit 20 for the specified physical channel, makes the tuner unit 20 execute to receive the broadcast signal in the frequency band corresponding to the specified physical channel, and judges whether or not the broadcast signal can be received (for example, whether or not the level of the received signal exceeds a predetermined level).

When the tuner has succeeded in acquiring (receiving) the broadcast signal, in step S215, the microcomputer 80 registers the channel number of the specified physical channel in the predetermined region of the memory medium 90 secured for recording the channel map data. In addition, in step S215, the microcomputer registers also various kinds of information on the physical channel in the predetermined region, In the present embodiment, the microcomputer registers at least the main channel number of a so called virtual channel, the sub channel number of the virtual channel, the broadcast station name, and the predetermined contents information showing the program contents. In the digital broadcast, because plural programs can be broadcasted by multiplexing the programs in one physical channel, a number is assigned to the virtual channel to distinguish the programs in the physical channel, segmentalizing the physical channel. The number of the virtual channel consists of the combination of the main channel number and the sub channel number.

Consequently, in step S215, the microcomputer 80 extracts the channel information, for example, a VCT (Virtual Channel Table) based on the PSIP (Program System Information Protocol) standard from the TS in the process of the decoding processing by giving instructions to the decode unit 60. Normally, such channel information (VCT) includes the number of the virtual channel, that is to say, the main channel number and sub channel number; so the microcomputer acquires the main channel number and the sub channel number referring to the VCT, relates these numbers to the registered physical channel, and records these numbers in the memory medium 90.

In step S215, in addition to the processing mentioned above, the microcomputer 80 extracts the program information from the TS in the process of the decoding processing by giving instructions to the decode unit 60. As the program information, the data related, for example, to the electronic program guide (EPG) based on the PSIP standard are conceivable. The microcomputer 80 acquires a broadcast station name corresponding to the acquired virtual channel, the predetermined contents information showing the program contents (in the present embodiment, the genre information showing the program contents) by referring to the extracted program information, relates this acquired information to the registered physical channel, and records the information in the memory medium 90. However, the concrete method of acquiring the main channel number of the virtual channel, the sub channel number of the virtual channel, the broadcast station name, and the predetermined contents information showing the program contents is not limited to the method described above.

In step S220, the microcomputer 80 specifies respective physical channels one by one to judge whether or not every physical channel has performed the processing of steps S210 and S215, and if there is an unspecified physical channel, the microcomputer returns to step S205, and repeats steps S210 and S215 for the newly specified physical channel. On the other hand, there is no unspecified physical channel, the microcomputer proceeds to the processing of step S225 or later.

With the processing up to step S220, the channel map data, that is to say, the data, in which various kinds of information (the main channel number of the virtual channel, the sub channel number of the virtual channel, the broadcast station name, and the contents information) to enable the TV 110 to receive the broadcast signal for each physical channel, have been generated in the memory medium 90. In this sense, it is possible to say that the microcomputer 80 or the TV 110 realizes the channel map data generating means as a part of the function thereof.

FIG. 3 shows an example of the channel map data T. Also, in addition to the various kinds of information described above, the channel map data T has the channel selection enable/disable information ("ADD" or "DEL" (delete)) that defines whether or not the channel can become the target of selection by the user. The processing of step S225 or later determines whether the microcomputer sets the channel selection enable/disable information to "ADD" that means that the channel selection is possible, or to "DEL" that means that the channel selection is impossible; however, at the time of step S220, the channel selection enable/disable information is set to "ADD" by default for all the physical channels.

In step S225, the microcomputer 80 selects one physical channel from the channel map data that are generated by the processing of steps up to step S220, and loads the information corresponding to the selected physical channel from the channel map data. As a matter of convenience, let the information to be loaded in step S225 be DataB. In step S225, at the time after starting the flowchart, the microcomputer selects the lowest-numbered physical channel among the physical channels that are not selected at that time as a loading target of Data B and that the channel selection enable/disable information is not set to "DEL." Therefore, after starting the flowchart, when the microcomputer proceeds to step S225 for the first time, the microcomputer selects the physical channel "3" according to the channel map data T shown in FIG. 3, and loads the information corresponding to this channel.

In step S230, the microcomputer 80 selects another physical channel different from the physical channel corresponding to which the information is loaded in step S225 from the channel map data, and loads the information corresponding to the selected physical channel from the channel map data. As a matter of convenience, let the information to be loaded in step S230 be Data C. In step S230, at the time after the latest step S225, the microcomputer selects the lowest-numbered physical channel among the physical channels whose numbers are greater than the number of the physical channel selected in the latest step S225 and not selected at that time as a loading target of Data C, and that the channel selection enable/disable information is not set to "DEL." Therefore, after starting the flowchart, when the microcomputer proceeds to step S230 for the first time, the microcomputer selects the physical channel "4" according to the channel map data T shown in FIG. 3, and loads the information corresponding to this channel.

In step S235, the microcomputer 80 compares the broadcast station name of Data B loaded in the latest step S225 with the broadcast station name of Data C loaded in the latest step S230, and judges whether or not these broadcast station names are the same. If the broadcast station names are the same, the microcomputer proceeds to step S240, and if the broadcast station names are not the same, the microcomputer proceeds to step S250. In step S240, the microcomputer 80 compares the contents information (the genre information) of Data B loaded in the latest step S225 with the contents information (the genre information) of Data C loaded in the latest step S230, and judges whether or not the two kinds of contents information are the same. If the two kinds of contents information are the same, the microcomputer proceeds to step S245, and if the two kinds of contents information are not the same, the microcomputer proceeds to step S250.

In step S245, the microcomputer 80 changes the setting of the channel selection enable/disable information for the physical channel related to Data C loaded in the latest step S230 to "DEL." That is to say, as a result of referring the channel map data as described above, because the microcomputer has judged that another physical channel with the same program exists for the physical channel selected in the latest step S230, it is found that the channel selection is not necessary, so the microcomputer sets the channel selection to a disable state. On the other hand, If the microcomputer has judged "No" in either of steps S 235 and 240, the program of the physical channel selected in the latest step 225 and the program of the physical channel selected in the latest step 230 are not necessarily the same, so the microcomputer does not change the setting of the channel selection enable/disable information for the physical channel selected in the latest step S230 (keeps "ADD").

In step S250, the microcomputer judges whether or not the microcomputer finishes selecting all the physical channels that can be selected as a loading target of Data C after the latest step S225; and if there is an unselected physical channel, the microcomputer returns to step S230, selects the physical channel as a new loading target of Data C, loads the information corresponding to the selected physical channel as Data C, and repeats the processing of steps S235 and later. On the other hand, if the microcomputer finishes selecting all the physical channels after the latest step S225, the microcomputer proceeds to step S255.

In step S255, the microcomputer judges whether or not the microcomputer finishes selecting all the physical channels that can be selected as a loading target of Data B after starting the flowchart; and if there is an unselected physical channel, the microcomputer returns to step S225, selects the physical channel as a new loading target of DataB, loads the information corresponding to the selected physical channel as DataB, and repeats the processing of steps S230 and later. On the other hand, if the microcomputer finishes selecting all the physical channels that can be selected as a loading target of Data B after starting the flowchart, the microcomputer finishes the flowchart. With this, updating the channel map data is completed. In this sense, it is possible to say that the microcomputer 80 or the TV 110 realizes the same program judging means and the physical channel selecting means as parts of the function thereof.

As mentioned above, when plural physical channels that receive the same program exist among the physical channels registered in the channel map data, the microcomputer changes the setting of the channel selection enable/disable information to "DEL" for the physical channels that receive the same program except the lowest-numbered physical channel among the physical channels. FIG. 3 shows an example that the microcomputer has judged that the physical channel "3" and the physical channel "8" receive the same program, and that the physical channel "5" and the physical channel "7" receive the same program, according to the processing of FIG. 2; in this case, for the physical channel "7" and the physical channel "8," the setting of the channel selection enable/disable information is changed to "DEL."

Hereinafter, the working after the channel setting processing will be described. When watching and listening the TV 110, a user can give the microcomputer 80 an instruction to switch the channel up or down by manipulating the channel up/down key of the remote controller or the like. Upon accepting the instruction of channel up/down, the microcomputer refers to the channel map data saved in the memory medium 90 at that time, and makes the tuner unit 20 execute the switching of channel up/down for only the physical channel in which the channel selection enable/disable information is set to "ADD" as a target. Therefore, citing the example of FIG. 3, the physical channels "7" and "8" are excluded from the switching targets (skipped) when switching the channel by means of the channel up/down operation.

Figure 4:
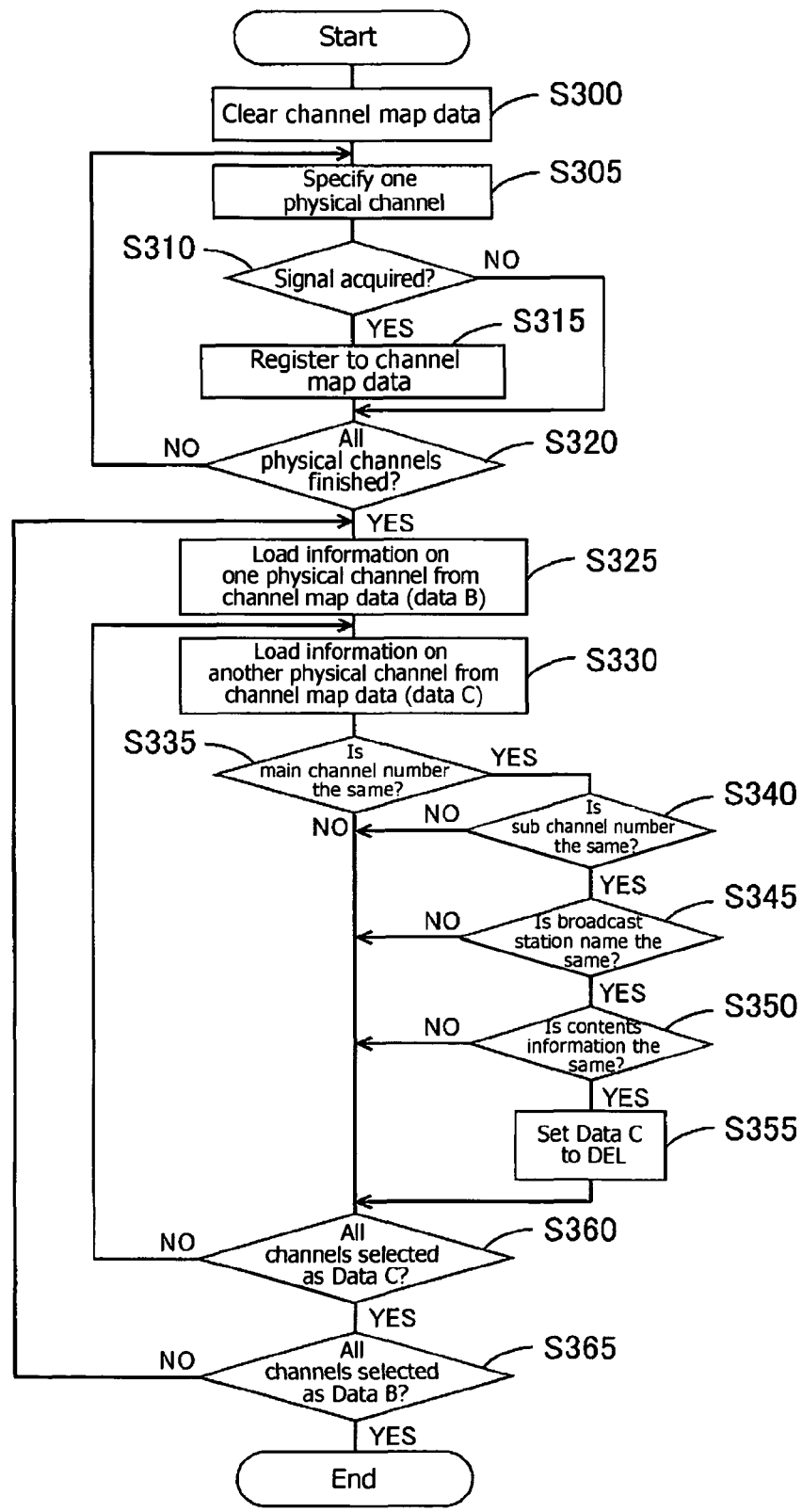
FIG. 4 is a flowchart showing another example of channel setting processing.

FIG. 4 is a flowchart showing another example of channel setting processing to be executed by the TV 110. The processing of steps of S300 to S330, S360, S365 in FIG. 4 are the same as the processing of steps of S200 to S230, S250, S255 in FIG. 2, so the explanations of these steps are abbreviated. In the embodiment related to FIG. 2 described above, the microcomputer judged whether or not the program is the same based on whether or not the broadcast station and the contents information are the same, but in the embodiment related to FIG. 4, judging elements for the sameness of the programs is added furthermore. That is to say, in step S335, the microcomputer 80 compares the main channel number of Data B loaded in the latest step S325 with the main channel number of Data C loaded in the latest step S330 to judge whether or not these main channel numbers are the same; if the main channel numbers are the same, the microcomputer proceeds to step S340, and if the main channel numbers are not the same main channel number, the microcomputer proceeds to step S360.

In step S340, the microcomputer 80 compares the sub channel number of Data B loaded in the latest step S325 with the sub channel number of Data C loaded in the latest step S330 to judge whether or not these sub channel numbers are the same; if the sub channel numbers are the same, the microcomputer proceeds to step S345, and if the sub channel numbers are not the same, the microcomputer proceeds to step S360. In step S345, the microcomputer 80 compares the broadcast name of Data B loaded in the latest step S325 with the broadcast name of Data C loaded in the latest step S330 to judge whether or not these broadcast names are the same; if the broadcast names are the same, the microcomputer proceeds to step S350, and if the broadcast names are not the same, the microcomputer proceeds to step S360. In step S350, the microcomputer 80 compares the contents information (genre information) of Data B loaded in the latest step S325 with the contents information (genre information) of Data C loaded in the latest step S330 to judge whether or not the two kinds of contents information are the same; if the two kinds of contents information are the same, the microcomputer proceeds to step S355, and if the two kinds of contents information are not the same, the microcomputer proceeds to step S360.

In step S355, the microcomputer 80 changes the setting of the channel selection enable/disable information for the physical channel related to Data C loaded in the latest step S330 to "DEL." That is to say, as a result of referring to the channel map data, because the microcomputer judges that another physical channel with the same program exists for the physical channel selected in the latest step S330, the microcomputer sets the physical channel to a state unable to select the channel. On the other hand, if the microcomputer judges "No" in anyone of steps S335 to S350, the microcomputer judges that the program of the physical channel selected in the latest step S325 is not the same as the program of the physical channel selected in the latest step S330, the microcomputer does not change the setting of the channel selection enable/disable information for the physical channel selected in the latest step s330 (keeps "ADD").

Figure 5:
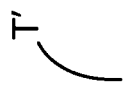
FIG. 5 is a diagram showing another example of channel map data.

FIG. 5 shows the final channel map data T' obtained by applying the embodiment of FIG. 4. In FIG. 5, the microcomputer judges that the physical channel "3" and the physical channel "8" receive the same program, and in this case, the microcomputer changes the setting of the channel selection enable/disable information for the physical channel "8" to "DEL". Therefore, if such channel map data T' is generated, in the event of accepting the instruction of the channel up/down, the microcomputer refers to the channel map data T', and excludes the physical channel "8" from the target of channel switching by means of the operation of channel up/down (makes the tuner 20 execute the switching of channel up/down excluding the physical channel "8").

In addition, the judgment whether or not there is a physical channel that receives the same program among the physical channels recorded in the channel map data is not limited to the examples shown in FIGS. 2 and 4; alternatively the micro computer can perform the judgment by judging two or more kinds of information among various kinds of information (the main channel number of the virtual channel, the sub channel number of the virtual channel, the broadcast name, the contents information) recorded in the channel map data whether or not the various kinds of information are the same.

(3) Conclusion

As mentioned above, according to the present embodiment, the microcomputer: generates the channel map data recorded the information such as a main channel number of the virtual channel, a sub channel number of the virtual channel, a broadcast name, and contents information for each physical channel through which a television broadcast signal is acquired by automatically scanning each frequency band based on the channel information and the program information extracted from the decoded results of television broadcast signals, judges whether or not plural physical channels to receive the same program are registered in the generated channel map data by means of whether or not at least two kinds of information in the above mentioned information are the same between the physical channels; if plural physical channels to receive the same program are registered, sets the channel selection enable/disable information to "DEL" for the physical channels other than one of the physical channels related to the same program (for example the lowest-numbered physical channel); and for the instruction of channel up/down through external manipulation, switches the channel at the state with the physical channels, which are set to "DEL" as mentioned above, excluded from the selection target.

The above-mentioned configuration permits of automatic exclusion of unnecessary physical channels from the targets of the channel selection to decrease the number of channels to be selected with the channel up/down key. This makes it possible to simplify a user's troublesome channel up/down key operation with the remote controller or the like, which is caused by the situation where the same program is shared among other physical channels, leading to a user's comfortable operating condition. In addition, according to the present embodiment, judgment is made such that whether or not plural physical channels to share the same program are registered by means of whether or not at least two kinds of information among the various kinds of information are the same between the physical channels, making it possible to accurately judge the sameness of the programs. This configuration can avoid the disadvantage that, despite the programs are actually different, misjudges the programs as the same program based on the insufficient information thereby to cause the channels that should be selected to be unable to be selected.

While the invention has been particularly shown and described with respect to preferred embodiments thereof, it should be understood by those skilled in the art that the foregoing and other changes in form and detail may be made therein without departing from the sprit and scope of the invention as defined in the appended claims.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A channel setting apparatus, enabling any one physical channel from among different physical channels on standby for receiving a broadcast signal, selected for use based on a predetermined criterion, the channel setting apparatus, comprising:

a processor; said processor executing a plurality of units including:

a channel map data generating unit for generating a channel map data, including physical channel information about a physical channel available to receive a broadcast signal;

the physical channel information is at least a main channel number of a virtual channel, a sub channel number of the virtual channel, a broadcast station name, and a predetermined program information indicating program contents;

a same program judging unit for determining if there exist a plurality of physical channels on standby for reception and capable of sharing same program there between based on the physical channel information, which is recorded on a channel to channel in the channel map data, wherein the same program judging unit selects a first physical channel and a second physical channel from the channel map data, performs a first judgment step that judges whether the main channel number of the first physical channel and the main channel number of the second physical channel are same or not, when a judgment result in the first judgment step indicates that these main channel numbers are same, performs a second judgment step that judges whether the sub channel number of the first physical channel and the sub channel number of the second physical channel are same or not, when a judgment result in the second judgment step indicates that these sub channel numbers are same, performs a third judgment step that judges whether the broadcast station name of the first physical channel and the broadcast station name of the second physical channel are same or not, when a judgment result in the third judgment step indicates that these broadcast station names are same, performs a fourth judgment step that judges whether the program information indicating program contents of the first physical channel and the program information indicating program contents of the second physical channel are same or not, when a judgment result in the fourth judgment step indicates that these program information are same, determines that the first physical channel and the second physical channel are sharing the same program and selects a new second physical channel from the channel map data, when the judgment result in any one of the first, second, third and fourth judgment steps indicates that these are not same, selects a new second physical channel from the channel map data, and repeats from the first judgment step using the first physical channel and the newly selected second physical channel;

a physical channel setting unit for setting an information defining selection disable in the channel map data for the second physical channels sharing the same program with the first physical channel based on the determination by the same program judging unit; and a physical channel selecting unit, by referring to the channel map data, switching channel for only the physical channels to which the information defining selection disable are not set in the channel map data in response to an instruction of physical channel selection with channel up or down key operation through external manipulation.

2. A television that performs the channel setting processing to enable any one channel from among different channels on standby for receiving a broadcast signal, selected for use based on a predetermined criterion, the television comprising:

a tuner unit sequentially receiving television broadcast signals in respective frequency ranges corresponding to respective physical channels specified after selection through a proper operating procedure;

a decode unit that decodes the television broadcast signals received by the tuner unit and extracts predetermined channel information and program information included in the television broadcast signals; and a microcomputer that, based on the extracted predetermined channel information and the program information, generates channel map data, including physical channel information about a physical channel available to receive a television broadcast signal, the physical channel information is at least a main channel number of a virtual channel, a sub channel number of the virtual channel, a broadcast station name, and genre information indicating the genre of the program contents;

the microcomputer, by referring to the channel map data, determines if there exists plural physical channels sharing same program, wherein selects a first physical channel and a second physical channel whose number is greater than a number of the first physical channel from the channel map data, performs a first judgment step that judges whether the main channel number of the first physical channel and the main channel number of the second physical channel are same or not, when a judgment result in the first judgment step indicates that these main channel numbers are same, performs a second judgment step that judges whether the sub channel number of the first physical channel and the sub channel number of the second physical channel are same or not, when a judgment result in the second judgment step indicates that these sub channel numbers are same, performs a third judgment step that judges whether the broadcast station name of the first physical channel and the broadcast station name of the second physical channel are same or not, when a judgment result in the third judgment step indicates that these broadcast station names are same, performs a fourth judgment step that judges whether the genre information of the first physical channel and the genre information of the second physical channel are same or not, when a judgment result in the fourth judgment step indicates that these genre information are same, determines that the first physical channel and the second physical channel are sharing the same program and selects a new second physical channel from the channel map data, when the judgment result in any one of the first, second, third and fourth judgment steps indicates that these are not same, selects a new second physical channel from the channel map data, and repeats from the first judgment step using the first physical channel and the newly selected second physical channel;

based on the determination where the first physical channel and the second physical channel are sharing the same program, sets an information defining selection disable in the channel map data for the second physical channels sharing the same program with the first physical channel, by referring to the channel map data, switches channel for only the physical channels to which the information defining selection disable are not set in the channel map data in response to a instruction of physical channel selection with channel up or down key operation through external manipulation.

3. A broadcasting receiver, comprising:

a processor; said processor executing a plurality of units including:

a channel map data storing unit for storing a channel map data including physical channel information about a physical channel available to receive a broadcast signal;

the physical channel information is at least a main channel number of a virtual channel, a sub channel number of the virtual channel, a broadcast station name, and a predetermined program information indicating program contents;

a same program judging unit for judging if there exist a plurality of physical channels sharing same program based on the physical channel information, which is recorded on a channel to channel in the channel map data, wherein the same program judging unit
- selects a first physical channel whose number is lowest among the physical channels from the channel map data,
- selects a second physical channel whose number is lowest among the physical channels from the channel map data with the exception of the first physical channel,
- judges whether the first physical channel and the second physical channel are sharing the same program on the basis of at least two kinds of information among the physical channel information for the first physical channel and the second physical channel recorded in the channel map data,
- then selects a third physical channel whose number is lowest among the physical channels from the channel map data with the exception of the first physical channel and the second physical channel, and
- judges whether the first physical channel and the third physical channel are sharing the same program on the basis of at least two kinds of information among the physical channel information for the first physical channel and the third physical channel recorded in the channel map data.

4. The broadcasting receiver according to claim 3, wherein the same program judging unit at least performs a first judgment step that judges whether the broadcast station names are same between the selected two physical channels for the judgment, and performs a second judgment step that judges whether the predetermined program information indicating program contents are same between the selected two physical channels for the judgment when a judgment result in the first judgment step indicates that these broadcast station names are same.

* * * * *